Dec. 18, 1928.  1,695,890

C. LE G. FORTESCUE

MEASURING INSTRUMENT

Filed March 18, 1925

WITNESSES:

INVENTOR
Charles L. Fortescue.
BY
ATTORNEY

Patented Dec. 18, 1928.

1,695,890

UNITED STATES PATENT OFFICE.

CHARLES LE G. FORTESCUE, OF PITTSBURGH, PENNSYLVANIA, ASSIGNOR TO WESTINGHOUSE ELECTRIC & MANUFACTURING COMPANY, A CORPORATION OF PENNSYLVANIA.

MEASURING INSTRUMENT.

Application filed March 18, 1925. Serial No. 16,389.

My invention relates to measuring instruments, and particularly to instruments for indicating conditions of unbalance in polyphase circuits.

One object of my invention is to provide a measuring instrument that shall indicate whether a load is increasing or decreasing the unbalance of a supply circuit.

Another object of my invention is to provide a measuring instrument for a polyphase circuit comprising a wattmeter element and means for modifying the operation of said element in accordance with the extent of unbalance in the polyphase circuit.

Another object of my invention is to provide a measuring instrument comprising a wattmeter and an opposing phase-sequence meter that have such relative torques that an indication is produced of unbalanced relations in the associated circuit.

A measuring instrument constructed in accordance with my invention comprises a wattmeter and a positive phase-sequence power meter having substantially equal torques under balanced circuit conditions. Under unbalanced conditions, the positive phase-sequence meter element has a greater or lesser torque than the wattmeter element depending upon whether the load circuit or the supply is more unbalanced, as the torque of the wattmeter element is proportional to the algebraic sum of the positive and negative phase-sequence power. Accordingly, the deflection of the instrument provides an indication of whether the load is increasing or decreasing the unbalance of the system.

Figure 1:
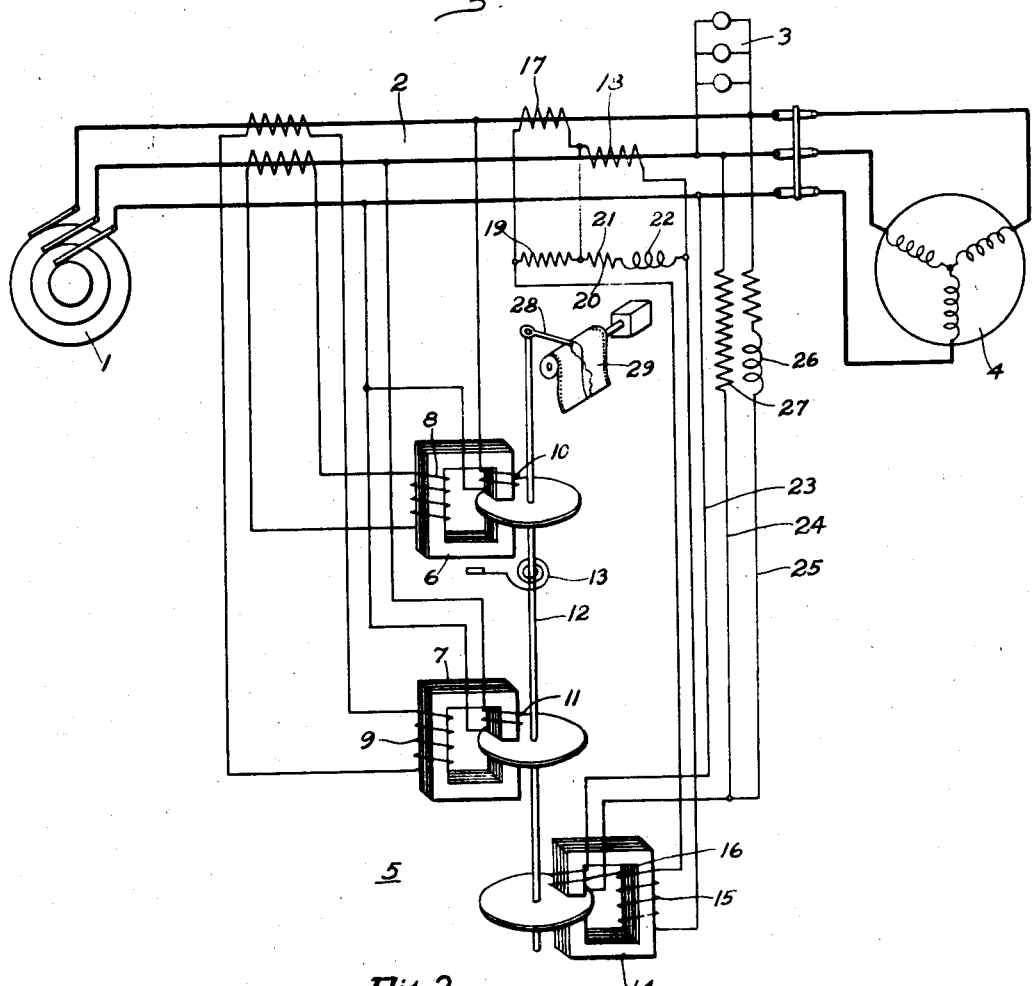
Figure 2:
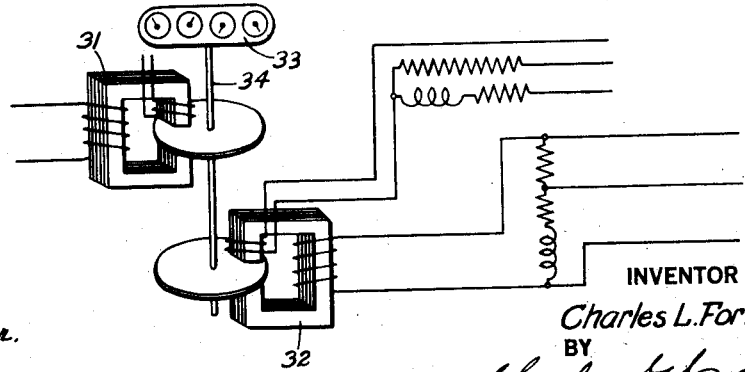

The nature of my invention may be clearly understood upon reference to the accompanying drawing, in which Fig. 1 is a diagrammatic view of a recording instrument embodying my invention; and Fig. 2 is a similar view of an integrating instrument embodying my invention.

In Fig. 1 is shown a three-phase generator 1 connected to a supply circuit 2. Single-phase and polyphase load devices 3 and 4 are connected to the supply circuit 2. A measuring instrument 5, connected to said supply circuit, is adapted to indicate whether the load connected to the supply circuit 2 is increasing or decreasing the unbalance thereof, assuming that an unbalanced condition exists.

In polyphase distribution systems, an unbalanced condition ordinarily results from the generation of an unbalanced voltage by the source of supply or from the connection of an unbalanced load to the circuit. It has been proposed to penalize a user of electric power in case the supply circuit is unbalanced, but it is necessary to distinguish between an unbalanced condition caused by the generator and one caused by the load. Furthermore, it would be desirable to reduce the charges of a customer who has a balanced load that would tend to balance an unbalanced supply circuit.

I attain these objects by the provision of an indicating instrument that indicates directly whether a load is tending to increase or decrease the unbalance of a supply circuit.

Referring to the accompanying drawing, wattmeter elements 6 and 7 of the induction type are provided with current and voltage coils 8, 9, 10 and 11 connected to the circuit 2 in the usual manner to actuate the movable element 12 in accordance with the polyphase power traversing said circuit under either balanced or unbalanced conditions.

A spring 13 is provided for restraining the movement of the element 12. A pointer 28 is secured to the movable element 12 and cooperates with a clock-driven chart 29 to provide a continuous record of the fluctuations thereof.

A positive phase-sequence power meter 14 is connected in opposition to the wattmeters 6 and 7. The positive phase-sequence power meter 14 is provided with current and voltage windings 15 and 16, respectively. The current winding 15 is connected to current transformers 17 and 18 in the circuit 2. The current transformers are shunted by a resistor 19 and an impedance 20 of equal absolute values. The impedance 20 is of such character that the voltage across the same is exactly in phase with the voltage across the resistor 19 under balanced conditions.

The currents traversing the secondary windings of the current transformers 17 and 18 under balanced conditions are 60° out of phase, and therefore, the impedance 20 comprises a resistor 21 and a reactor 22, the total impedance being exactly equal to the impedance of the resistor 19. Under these conditions, the current winding 15 of the positive phase-sequence meter is traversed by a current proportional to the positive phase-sequence component of current in the circuit 2.

If it is found that, for the connections shown, the phase rotation of the current traversing the conductors of the circuit 2 is such that the current winding 15 is traversed by the negative phase-sequence component instead of the positive phase-sequence component, it is only necessary to transpose the connections of the impedances 19 and 20 to the circuit 2.

The voltage winding 16 of the phase-sequence meter 14 is connected to the circuit 2 by the conductors 23, 24 and 25, the conductors 24 and 25 containing equal impedances 26 and 27 of such relative phase displacement that the currents traversing the conductors 24 and 25 are exactly in phase under balanced conditions. Under these conditions, the winding 16 of the meter element 14 is traversed by a current proportional to the positive phase-sequence component of voltage in the circuit 2 if the assumed phase rotation of the current traversing the conductors of the circuit is correct. If it is not correct and the winding 16 is traversed by current proportional to the negative phase-sequence component of voltage, it is only necessary to transpose two of the conductors 23, 24 and 25 to obtain the positive phase-sequence component.

The torque of the polyphase wattmeter is dependent upon the power traversing the circuit 2 and is the algebraic sum of the positive and negative sequence power. In case of an unbalanced condition, the torque of the polyphase wattmeter is also dependent upon whether the unbalance is caused by the source 1 or the load connected to the circuit, because its torque is proportional to the algebraic sum of the positive and negative sequence power traversing the circuit. The negative sequence power will be positive or negative with respect to the positive sequence power, depending upon whether the unbalance is inherent in the power source 1 or is due to the characteristics of the loads 3 and 4. If we assume that the generator 1 and the load 4 are each approximately balanced, the torque of the positive phase-sequence meter 14 is approximately equal and opposite to the torque of the polyphase wattmeters 6, 7. If the supply circuit 2 is unbalanced by reason of the connection of a single phase load 3 connected thereto, the torque of the positive phase-sequence meter 14 is greater than that of the wattmeter 6, 7, and the change in torque is dependent upon the amount of unbalance. The deflection of the pointer 28 indicates that the load is causing the supply circuit to be unbalanced. On the other hand, if the generator 1 or the transmission circuit impedance becomes unbalanced, the torque of the positive phase-sequence meter 14 is decreased proportionately and the pointer 28 is deflected in the opposite direction to indicate that the unbalanced condition is caused by the source of supply. A continuous record of the fluctuations of the pointer 28 is obtained upon the chart 29. This record may be compared with a record or load-demand over the same period, as the importance of an unbalanced load depends upon the magnitude of the load.

It will be seen, therefore, that the instrument 5 provides an indication of whether the load is increasing or decreasing the unbalance of the supply circuit and, therefore, a basis for altering the customer's charges in accordance with these factors.

In Fig. 2 a modification of the invention is shown comprising a wattmeter element 31 and a phase-sequence power meter-element 32. A polyphase wattmeter, as shown in Fig. 1, may be employed instead of the single-phase wattmeter 31. The instrument is provided with a register 33 for integrating the revolutions of the movable element 34 thereof. The elements 31 and 32 are connected to a three-phase circuit in the same manner as the elements 6 and 14 in Fig. 1.

The phase-sequence meter 32 may exert a torque upon the movable element 34 that is equal to or greater or less than that exerted by the wattmeter element 31. If the torques are approximately equal and opposite under balanced conditions, the registration of the instrument will be positive or negative depending upon the magnitude and duration of unbalanced load conditions in the circuit. If the torque of the wattmeter 31 is considerably larger than that of the phase-sequence meter 32 and in the same direction and is adjusted to integrate the watt-hours consumed in the circuit upon the register 33 under balanced conditions, the registration will be automatically compensated under unbalanced conditions to penalize the customer if it is the load that is causing the unbalance.

I do not consider that my invention is limited to the precise embodiment shown and described. Accordingly, I do not wish it to be limited in scope except as indicated in the appended claims.

I claim as my invention:

1. The combination with a polyphase supply circuit and a load, of means comprising a polyphase wattmeter and a phase-sequence wattmeter for indicating whether the load is increasing or decreasing the unbalance of the supply circuit.

2. A measuring instrument comprising a polyphase wattmeter and phase-sequence meter mechanically connected in opposition, the torques of said meters being equal under balanced circuit conditions.

3. A measuring instrument comprising a polyphase wattmeter element and a meter element opposing the torque of said wattmeter element, the torque of said meter element being dependent upon a function of the balance of the circuit quantities.

4. The combination with a polyphase supply circuit and a load, of a single phase phase-sequence meter element, and mechanism coacting therewith for indicating whether the load is increasing or decreasing the unbalance of said supply circuit.

5. In combination, a polyphase supply circuit, a load on said supply circuit, a single phase phase-sequence meter in circuit relation with said supply circuit, and means coacting with said phase-sequence meter for performing an indicating function of the unbalance of said supply circuit.

6. The combination with a polyphase supply circuit and a load, of means comprising a single phase phase-sequence meter element for indicating whether the load is increasing or decreasing the unbalance of the supply circuit.

7. In combination, a polyphase supply circuit, a measuring instrument associated with said supply circuit, said measuring instrument comprising two wattmeters having their shafts mechanically coupled, and means for unbalancing the torque of one of said wattmeters in accordance with the magnitude and cause of unbalanced conditions in said polyphase circuit.

8. In combination, a polyphase supply circuit, a load on said circuit, a measuring instrument associated with said circuit, said instrument comprising a wattmeter and a meter opposing the torque of said wattmeter, the combined torques of said meters being dependent upon the relative unbalance of said supply circuit.

9. In combination, a polyphase supply circuit, a load for said circuit, an instrument for measuring said load comprising a movable element, actuating means for said element responsive to the relative unbalance of said supply circuit and said load, and means for integrating the movement of said element.

10. The combination with a supply circuit and a load, of a measuring instrument for indicating the direction and magnitude of unbalance of said supply circuit comprising a wattmeter and a phase-sequence meter mechanically coupled together.

In testimony whereof, I have hereunto subscribed my name this 9th day of March, 1925.

CHARLES LE G. FORTESCUE.